United States Patent
Hiscock et al.

(10) Patent No.: US 11,555,932 B2
(45) Date of Patent: Jan. 17, 2023

(54) ROUND TRIP PHASE EXTENDED RANGE

(71) Applicant: QUALCOMM Incorporated, San Diego, CA (US)

(72) Inventors: Paul Dominic Hiscock, Cambridge (GB); Thomas Allan, St Neots (GB)

(73) Assignee: QUALCOMM INCORPORATED, San Diego, CA (US)

( * ) Notice: Subject to any disclaimer, the term of this patent is extended or adjusted under 35 U.S.C. 154(b) by 557 days.

(21) Appl. No.: 16/667,515

(22) Filed: Oct. 29, 2019

(65) Prior Publication Data
US 2021/0124061 A1 Apr. 29, 2021

(51) Int. Cl.
| | | |
|---|---|---|
| G01S 19/44 | (2010.01) | |
| H04W 4/80 | (2018.01) | |
| G01S 13/84 | (2006.01) | |
| G01S 19/04 | (2010.01) | |
| H04W 4/02 | (2018.01) | |
| G01S 11/02 | (2010.01) | |
| G01S 11/06 | (2006.01) | |

(52) U.S. Cl.
CPC ............. *G01S 19/44* (2013.01); *G01S 11/06* (2013.01); *G01S 13/84* (2013.01); *G01S 19/04* (2013.01); *H04W 4/023* (2013.01); *H04W 4/80* (2018.02)

(58) Field of Classification Search
CPC ......... H04W 4/023; H04W 4/80; G01S 13/84; G01S 11/02; G01S 11/06; G01S 5/14
See application file for complete search history.

(56) References Cited

U.S. PATENT DOCUMENTS

| | | | |
|---|---|---|---|
| 6,859,761 B2 * | 2/2005 | Bensky | G01S 13/84 |
| | | | 702/189 |
| 9,319,840 B2 | 4/2016 | Porzio Giusto | |
| 10,057,798 B2 * | 8/2018 | Jarvis | G01S 11/02 |
| 2006/0107307 A1 | 5/2006 | Knox et al. | |
| 2016/0077204 A1 * | 3/2016 | Lee | G01S 7/42 |
| | | | 342/126 |
| 2016/0104013 A1 | 4/2016 | Fessler et al. | |
| 2021/0078537 A1 * | 3/2021 | Ootaka | B60R 25/30 |

FOREIGN PATENT DOCUMENTS

WO  WO-2012155991 A1 * 11/2012 ............ G01S 11/02

OTHER PUBLICATIONS

International Search Report and Written Opinion—PCT/US2020/053221—ISA/EPO—Dec. 16, 2020.

\* cited by examiner

*Primary Examiner* — Cassi J Galt
(74) *Attorney, Agent, or Firm* — Muncy, Geissler, Olds & Lowe, P.C.

(57) ABSTRACT

Secure range estimates as described herein may include determining a range estimate between two Bluetooth enabled devices based, at least in part, on round trip phase measurements of wireless signals transmitted between the devices. In one example, a range estimate may include determining a first set of relative carrier measurements at a first set of frequencies, determining a second set of relative carrier measurements based on the first set at the second set of frequencies; and combining the first set and the second set to estimate a distance between the devices.

17 Claims, 6 Drawing Sheets

ROUND TRIP PHASE EXTENDED RANGE

FIELD OF DISCLOSURE

This disclosure relates generally to phase measurements, and more specifically, but not exclusively, to range estimates between two transmitters based on phase measurements.

BACKGROUND

Satellite positioning systems (SPSs), such as the global positioning system (GPS), have enabled navigation services for mobile handsets in outdoor environments. Likewise, particular techniques for obtaining estimates of positions of mobile devices in indoor environments may enable enhanced location based services in particular indoor venues such as residential, governmental or commercial venues. For example, a range between a mobile device and a transceiver positioned at a fixed location may be measured based, at least in part, on a measurement of a received signal strength (RSSI) or a round trip time (RTT) measured between transmission of a first message from a first device to a second device and receipt of a second message at the first device transmitted in response to the first message.

Use of RTT and RSSI measurements for ranging is very inaccurate in band limited systems such as Bluetooth. With RTT based ranging in particular, this is in part because narrow bandwidth may involve a blurring of multipath components. In wireless telecommunications, multipath is the propagation phenomenon that results in radio signals reaching the receiving antenna by two or more paths. Inaccuracy occurs also because accuracy typically depends on determination of precise times of reception and departure in the presence of drifting clocks and complex receive chains. Therefore, measuring ranges between devices using RTT based measurements is complex and may suffer inaccuracies in the presence of clock drift and multipath.

Phase based ranging techniques, also called round trip phase (RTP), rely on making multiple carrier phase measurements between two radio devices to determine their distance apart.

Antenna switching technology may be used to provide spatial diversity by making RTP measurements to each antenna element of an antenna array or a group of antennas with known relative positions. However, it should be understood that spatial diversity may improve RTP. RTP requires that each radio device measures the relative carrier phase of the other device's carrier and measurements are made at multiple frequencies over a range of frequencies. For example, the 80 MHz ISM band typically used by Bluetooth devices. One use case is security to ensure a user is close to an object. For example, a key fob for a car may only allow the engine to be turned on, or a door unlocked, if the key fob or device with a Bluetooth radio is within 1 meter of a Bluetooth receiver in the car. Phase-based solutions are subject to aliasing due to the phase measurements. In one configuration, the maximum range before aliasing occurs could be given by 150/Frequency-Step-MHz. In this example, for Bluetooth, with a step size of 1 MHz the maximum range is 150 m. At 151 m, the system would report 1 m (i.e., wrap around at the aliasing range of 150 m). A man-in-the-middle attack could introduce a delay in the radio signal that causes the apparent distance to be increased. For example, if the true distance between the authorized devices is 10 m, a man-in the-middle could introduce a delay equivalent to 141 m, which would cause the apparent distance to be 151 m, but this would be aliased back to a measurement of 1 m. This presents a major problem for a system that could be used in a security role, where a close distance between two secure devices is the means for verification. A secondary problem encountered by phase-based solutions is that they are sensitive to multipath, which can cause wrap around problems below the theoretical maximum range, for example below 150 m.

One solution is to reduce the Frequency-Step to 100 kHz, for example, that would result in a theoretical wraparound aliasing range of 1.5 km instead of 150 m. Since Bluetooth would not normally work above 100-300 m, this would provide a means to avoid the wrap around and multipath problems. However, the 80 MHz band with a step size of 100 kHz would require 800 measurements. This would be too slow and power hungry to present an effective solution. What is required is a means to achieve a large range but with fewer measurements.

Accordingly, there is a need for systems, apparatus, and methods that improve conventional approaches including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method includes: determining a first set of relative carrier measurements between a first device and a second device at a first set of frequencies; determining a second set of frequencies from the first set of relative carrier measurements; determining a second set of relative carrier measurements between the first device and the second device at the second set of frequencies; and combining the first set of relative carrier measurements and the second set of relative carrier measurements to estimate a distance between the first device and the second device.

In another aspect, a non-transitory computer-readable medium includes: determining a first set of relative carrier measurements between a first device and a second device at a first set of frequencies; determining a second set of frequencies from the first set of relative carrier measurements; determining a second set of relative carrier measurements between the first device and the second device at the second set of frequencies; and combining the first sets of relative carrier measurements and the second set of relative carrier measurements to estimate a distance between the first device and the second device.

In still another aspect, an apparatus includes: a memory; an antenna; and a processor coupled to the memory and the antenna, the processor configured to: receive a first set of carrier signals from a second device at a first set of frequencies; determine a first set of relative carrier measurements between the wireless device and the second device at the first set of frequencies based on the first set of carrier signals; determine a second set of frequencies from the first set of relative carrier measurements; receive a second set of carrier signals from the second device at a second set of frequencies; determine a second set of relative carrier measurements between the wireless device and the second device at the second set of frequencies based on the second set of carrier signals; and combine the first set of relative carrier measurements and the second set of relative carrier measurements to estimate a distance between the wireless device and the second device.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
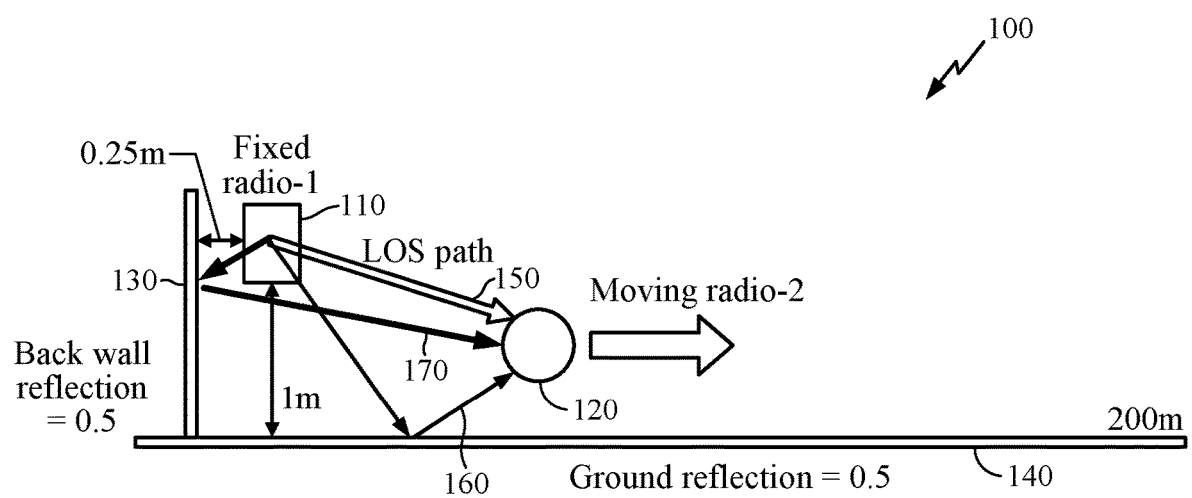
FIG. 1 illustrates an exemplary wireless communication network in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein provide improvements to conventional methods, apparatus, and systems, as well as other previously unidentified needs. Round Trip Phase, also known as phase-based ranging, is a well-known technique for determining the range between two radios by making relative carrier measurements, usually over multiple frequencies. In the context of this application a relative carrier measurement (e.g., phase, amplitude, magnitude, etc.) is made between a first device (e.g., radio) and a second device (e.g., radio) nominally tuned to the same frequency, and importantly comprises a phase part formed from the sum of a first carrier phase measurement and a second carrier phase measurement and an optional magnitude part that indicates the signal strength between the devices at each carrier frequency. The first carrier phase measurement is the phase of an IQ sample (i.e., one or more samples) captured at a known time, in the first radio receiver, tuned to receive a carrier tone signal transmitted by the second radio transmitter. The second carrier phase measurement is the phase of an IQ sample captured at a known time, in the second radio receiver, tuned to receive a carrier tone signal transmitted by the first radio transmitter. In practice, the first carrier phase measurement and second carrier phase measurements are made within a short time interval. For example, a few 10s of microseconds. Also, the first carrier frequency and second carrier frequency are within a few kilohertz of each other. In one implementation, the internal oscillators of both radios are allowed to run without adjustment during and between both measurements. One of the carrier phase measurement values is sent via a message from one radio to the other, such that one radio now has both carrier phase measurement values. The two carrier phase measurements are added, which removes the unknown start phases of each oscillator, and the result is used to form the phase part of the relative carrier measurement. The optional magnitude part of the relative carrier measurement is determined from the magnitude of the IQ sample from either radio. Alternatively, the magnitude part of the relative carrier phase measurement is determined from the average magnitude from the IQ samples from both radios.

In an alternative implementation to reduce the messaging between radios, the phase of the carrier tone transmitted from the first radio is adjusted, roughly midway between the two carrier phase measurements, by adding the first carrier phase measurement. If the radio has an IQ modulator, the phase change can be applied by changing the phase of the digital tone signal being modulated. If the radio has a frequency-based modulator, a phase change can be achieved by manipulating the carrier frequency over time to impart a desired phase change, taking into account the frequency response of the PLL. For example, to increase the phase by 45 degrees the carrier frequency could be adjusted by 250 kHz for a period of 0.5 microseconds, and then manipulated to counter the effects of the PLL which is trying to remove the applied phase offset. The phase offset needs to be maintained while IQ samples are being taken. Hence, the second carrier phase measurement will now contain the added phase from the first carrier phase measurement and so there is no need to send a message containing the carrier phase measurement between the radios. Hence, this approach benefits from less messaging between the radios.

In practice, the second device transmits a first carrier from its local oscillator (LO), while the first device receives it, by mixing with it's LO set to a frequency close to the transmitted carrier frequency. The first device captures IQ samples from which a first carrier phase estimate is made. Then, the second device changes from transmit to receive, and the first device changes from receive to transmit, within a few microseconds. Hence, the first device now transmits its carrier from it's LO, while the second, mixes down using it's LO, and a second carrier phase estimate is made. In this description a phase estimate represents the phase of a complex or IQ number, which may be explicitly evaluated and expressed in radians or degrees or could be implicitly represented by the phase of the complex or IQ number itself.

For a more effective range estimate over conventional methods, the process may only use phase-based information, have a lower power than conventional methods, and not increase the error due to multipath problems. In one example, a first device makes measurements of the carrier phase of the other's device carrier signal. The measurements are made at different frequencies with the first device collecting an IQ sample for each measurement representing the relative phase of the respective carrier signal. The IQ sample's amplitude reflects the signal strength and can indicate fading. In this example, the time of transmission of the carrier signals should be known to about 1us and frequency of each carrier signal should be known to a few kHz (resulting in a small error). The phases of the IQ samples from the first device are added (i.e., the phases from the first device and the second device may be added on a frequency by frequency basis to remove the unknown starting phase). The added phase is proportional to the distance, modulo the wavelength. Modulo is a math operation that finds the remainder when one integer is divided by another. In writing, it is frequently abbreviated as mod, or represented by the symbol %. For two integers a and b: a mod b=r where a is the dividend, b is the divisor (or modulus), and r is the remainder. In addition, multiple measurements at different frequencies allow the alias range to increase. For example, a spacing of 1 MHz over the 80 MHz industrial, scientific, and medical (ISM) band results in 80×IQ samples being measured by the first device and 80×IQ measurements at the second device. The added phases are ordered by frequency and then unwrapped. Unwrapping removes big discontinuities to aid a best fit line determination that benefits from enough closely spaced points. A best fit line ("trend line") is determined through the unwrapped phase data. The gradient of the line is proportional to the distance between the first device and the second device. In this example, 80×1 MHz measurements result in a 150 m maximum alias range. If the samples are further apart (e.g., 4 MHz), the alias range reduces to approximately 37.5 m.

In addition, a three-part process may result in better estimates with fewer samples and less power. In this example, the process is configured in order to avoid fades or areas of constructive interference within the spectrum. These regions could have large phase changes and be prone to error. In this example, the process begins with a first (course) part. The process starts in the first part with making a coarsely spaced set of RTP measurements over the ISM band (i.e., a first set of relative carrier measurements). In one example, 20 coarse phase measurements are made from 2402 to 2478 in steps of 4 MHz (i.e., 20×4 MHz measurements). It should be understood that more or less than 20 coarse phase measurements may be made depending on the frequency band being covered and the step size of frequency change (e.g., 80 MHz ISM band with 2 MHz spacing would make 40 measurements (i.e., 80/2). The process may then find the best frequency region with the best area of constant magnitude (i.e., amplitude). Typically, the best area will have a middle or average amplitude relative to the set. Generally, the areas with the lowest amplitude indicate fading and the areas with the highest amplitude indicate constructive interference. The frequency range of the best area may then be used for the second part of the three-part process.

Next, in the second (finely-spaced) part, the frequency range of the best area is used. This frequency range is a subset of the frequency range used for the first part. The process continues with making a finely spaced set of RTP measurements centred on the best frequency range (i.e., a second set of relative carrier measurements). In one example, 20 measurements are made over a 2 MHz frequency range of the best area in steps of 0.1 MHz (20×0.1 MHz measurements). It should be understood that a frequency range of greater or lesser than 2 MHz may be used and a step increment of larger or smaller than 0.1 MHz may be used. It is beneficial for the frequency range of the best area to be a subset of the frequency range used in the first part and for the step increment of the second part to be smaller than the step increment used in the first part. Then, the second (finely-spaced) set of RTP measurements is ordered by frequency and unwrapped to form a set of fine phase measurements. The fine phase measurements have been made over a subset of the whole ISM band but with a smaller frequency spacing. A best fit line is determined from the fine phase measurements to obtain a rough gradient, which is proportional to a rough distance estimate. The distance estimate is rough because only part of the spectrum was used and so may contain a larger error due to multipath. The distance estimate is long-range because the measurements are closer in frequency, and less likely to wrap around or alias.

Next, in the third (combine) part, the coarse phase measurements from the first part are ordered by frequency. Then, the phases are unwrapped but multiples of 2π are added to keep the final gradient close to the rough gradient. Then, a best fit line is determined from these unwrapped results along with the gradient of the line of best fit. Lastly, an accurate and long-distance estimate from the gradient is obtained.

The second part obtains a long-distance estimate while the third part refines the estimate to make it more accurate than the rough estimate. Thus, in this example a total of 40 measurements are made to determine an accurate and long-range distance. This can achieve accuracy close to 800 measurements based on 100 kHz separation over 80 MHz.

In an alternative algorithm, both the phase and amplitude of the carrier measurements are used to determine the second frequency region. For example, the signal phase may undergo a significant phase shift or inversion when several multipath elements combine, and this can be used to infer frequency regions to be avoided.

In a further alternative algorithm, phase and amplitude measurements from current and previous measurements can be combined to track previous fading regions that may be avoided in the current measurements.

In a refinement applicable to the three algorithms described above, where one or both radio devices have multiple antenna elements, further improvements in performance are achieved by making coarse and fine RTP carrier measurements between each antenna element attached to the first device and one or more antenna elements of the second device. In an example implementation, the two measured phase values from each individual RTP carrier measurement, between any two antenna elements, are added and combined with a magnitude part that represents the carrier magnitude, to construct a complex RTP carrier measurement. The complex RTP carrier measurements for all antenna combinations, at the same nominal carrier frequency, are added to form a total RTP carrier measurement. Each total RTP carrier measurement benefits from spatial diversity so the effects of multipath are reduced compared to a single antenna solution. These total RTP carrier measurements can then be used in place of the (single antenna) RTP measurements as described in the first, second and third techniques of the algorithm described above, which provides improvements to all stages of the algorithm, and reduces the final ranging error.

Figure 2:
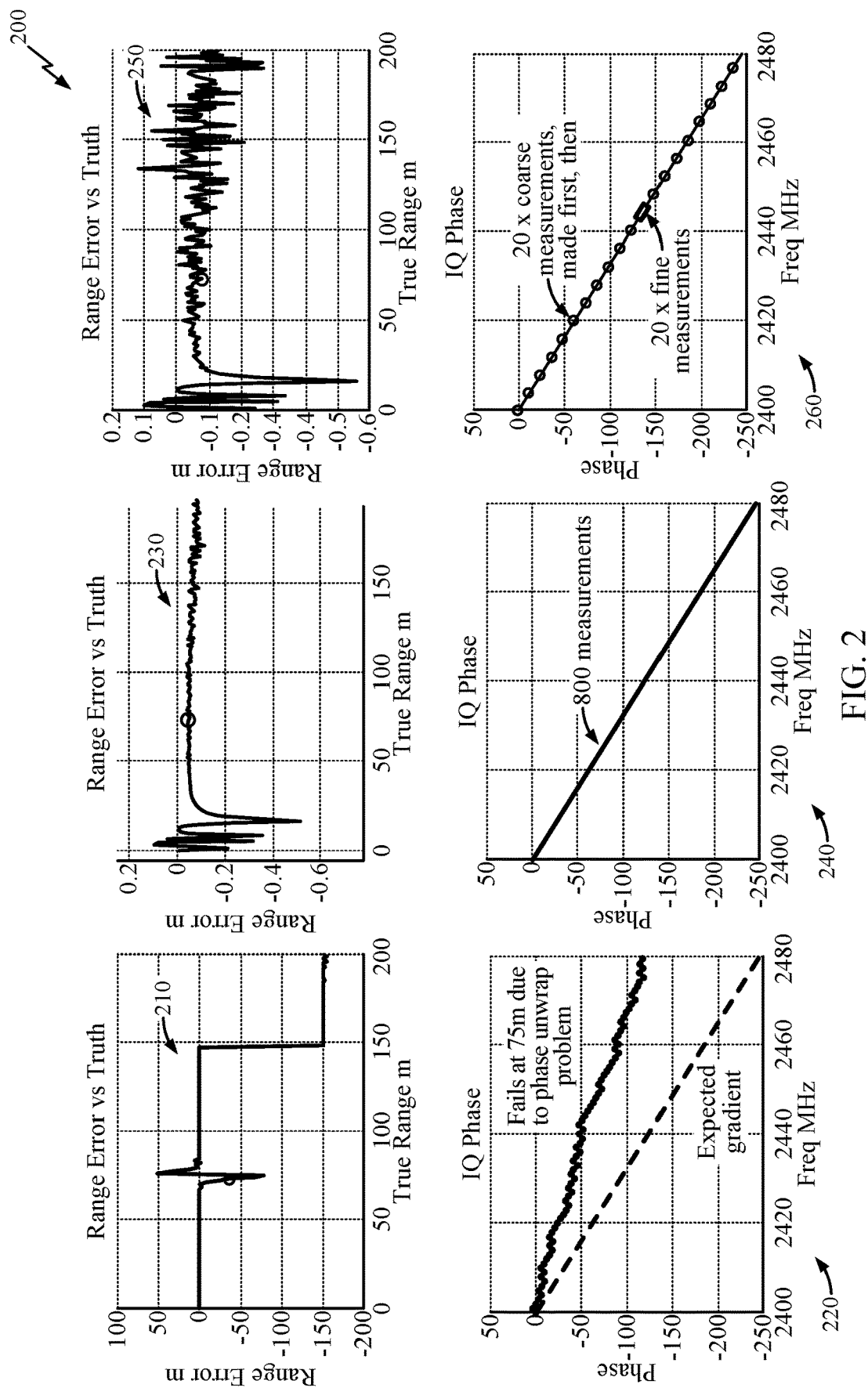
FIG. 2 illustrates exemplary graphs in accordance with some examples of the disclosure.

FIG. 1 illustrates an exemplary wireless communication network in accordance with some examples of the disclosure. As shown in FIG. 1, a communications network 100 may include a second device 110 (i.e., fixed radio-1) and a first device 120 (i.e., moving radio-2). In this example, there may be multipath issues associated with reflections from a back wall 130 and the ground 140. As shown, the second device 110 is 0.25 m from the back wall 130 and 1 m above the ground 140. The signals from the second device 110 will follow a line of sight (LOS) path 150 directly to the first device 120, ground reflection path 160, and a back wall reflection path 170. As the first device 120 moves away from the second device 110 out to a distance of 200 m, two reflections occur—from the back wall 130 behind the second radio and the ground 140. Assuming a reflection coefficients of 0.5 for the back wall 130 and the ground 140, a signal to noise ratio (SNR) is approximately 20 dB and phase noise=1-degree root mean squared (RMS). At each meter, a determination of a distance estimate is made (e.g., using any of the processes described herein) for 200 distance estimates results. The graphs at the top of FIG. 2 show the range error in meters for three modified RTP techniques as the radios are separated from 0 to 200 meters. The graphs at the bottom of FIG. 2 show the associated snapshot of the phase of the RTP measurements at a known distance of 75 m. Each of the lower graphs plot the unwrapped RTP carrier phase measurement in radians against frequencies in the ISM band from 2.4 to 2.8 GHz (e.g., 2402 GHz to 2478 GHz). Each RTP carrier phase measurement is the sum of the carrier phase-measurement made by device 110 and the carrier phase-measurement made by device 120, at a specific carrier frequency. In practice, a first device, either device 110 or device 120, transmits its carrier first and the second device makes a measurement of that carrier signal, then a few microseconds later, the roles are reversed, and a second carrier measurement is taken by the first device of the carrier signal transmitted by the second device. It does not matter which device starts. When the RTP carrier phase measurements are suitably unwrapped, the gradient of the best fit line is an estimate of the separation between the radios. More specifically the distance estimate $\hat{d}$ is given by $$\hat{d} = -\frac{d\theta}{df}\frac{c}{4\pi},$$

where θ is the unwrapped phase sum in radians, f is frequency in Hz and c is the speed of light in meters per second.

FIG. 2 illustrates exemplary graphs in accordance with some examples of the disclosure. The first technique is shown in graphs 210 and 220. The first technique uses a first set of carrier signals from the second device 110 at a first set of frequency points (i.e., 80) at 1 MHz spacing between each adjacent frequency point. As can be seen in graph 210, the range estimate is accurate until approximately 75 m and aliases after 150 m (i.e., large error) due to the phase unwrap problem discussed above. As can be seen in graph 220, the resulting best fit line's gradient flattens around 75 m and deviates significantly from the expected gradient. The maximum error range of graph 210 is about 200 m, which represents is a significant measurement failure. Whereas, graphs 230 and 250 show two examples of successful results with a maximum error range of about 0.5 m.

The second technique uses a first set of RTP carrier measurements made between device 110 and device 120 at a first set of frequencies points, for example 800 points at 0.1 MHz spacing between each adjacent frequency point. As can be seen in graph 230, the range estimate is much better with an overall RMS error of approximately 9 cm. As can be seen in graph 240, the resulting best fit line's gradient follows the expected gradient. However, using 800 measurements requires significantly more power and time than the first technique. The third technique uses a first set of coarse carrier measurements made between device 110 and device 120 at a first set of coarse frequency points, for example, 20 points spaced at 4 MHz and a second set of carrier measurements taken a second set of fine frequencies points, for example, 20 points spaced at a 0.1 MHz. The frequency range of the second set of frequencies is determined from the amplitude measurements from the first set of coarse measurements and is described in detail below. As can be seen in graph 250, the range estimate follows the same basic profile as graph 230, with a slightly increased RMS error of approximately 10.5 cm. As can be seen in graph 260, the resulting best fit line's gradient follows the expected gradient. Hence, the set of 20 coarse and 20 fine measurements has achieved an accuracy performance close to using 800 measurements used in the second technique but without causing the alias problem of the first technique that required 80 measurements. Hence, the coarse and fine algorithm has achieved an alias free measurement using less measurements and hence less power than the other techniques.

Figure 3:
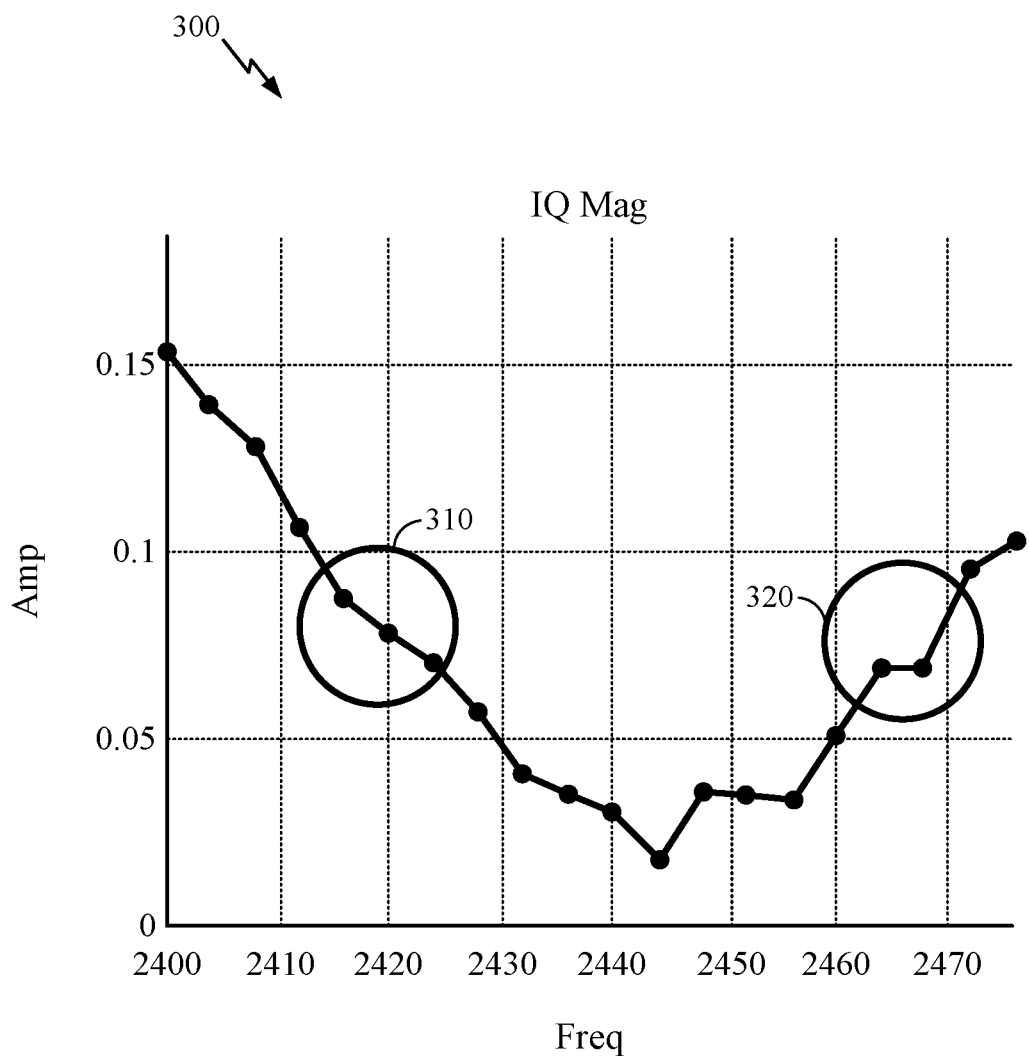
FIG. 3 illustrates an exemplary graph of IQ magnitude in accordance with some examples of the disclosure.

FIG. 3 shows the magnitude of the coarse carrier measurements collected during the third technique described in connection with FIG. 2. FIG. 3 illustrates an exemplary graph of IQ magnitude in accordance with some examples of the disclosure. As shown in FIG. 3, a graph 300 of IQ magnitude is based on the third technique described in connection with FIG. 2 illustrates how the second set of frequencies is determined from the first set of coarse carrier measurements. As discussed above, a first set of frequencies 20×4 MHz spacing spanning the ISM band is used. For each frequency, the corresponding carrier magnitude is plotted. Signal fades will tend to be found in regions of low magnitude while constructive interference tends to be found in areas of high magnitude. Therefore, the process selects a frequency region from an area that is reasonably flat and with approximately middle magnitude. In this example, a first region 310 and a second region 320 are highlighted as good candidates. One such candidate is selected and, in this example, 20 measurements are made over a 2 MHz frequency range of the best area in steps of 0.1 MHz (20×0.1 MHz measurements). It should be understood that a frequency range of greater or lesser than 2 MHz may be used and a step increment of larger or smaller than 0.1 MHz may be used. It is beneficial for the frequency range of the best area to be a subset of the frequency range used in the first part and for the step increment of the second part to be smaller than the step increment used in the first part.

Figure 4:
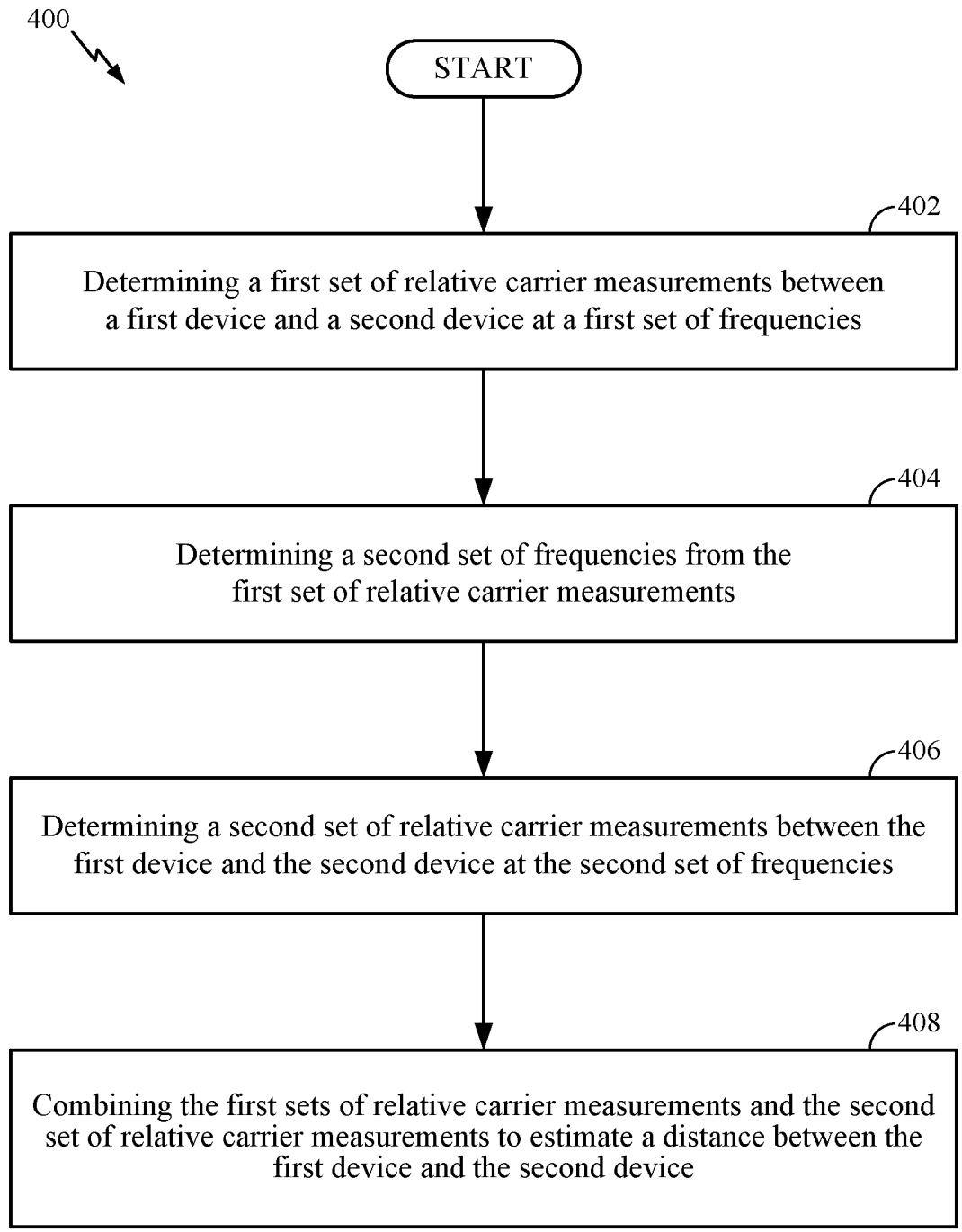
FIG. 4 illustrates an exemplary method in accordance with some examples of the disclosure.

FIG. 4 illustrates an exemplary partial method in accordance with some examples of the disclosure. As shown in FIG. 4, a partial method 400 for a range measurement between two devices may begin in block 402 with determining a first set of relative carrier measurements between a first device and a second device at a first set of frequencies. The partial method 400 may continue in block 404 with determining a second set of frequencies from the first set of relative carrier measurements. The partial method 400 may continue in block 406 with determining a second set of relative carrier measurements between the first device and the second device at the second set of frequencies. The partial method 400 may conclude in block 408 with combining the first sets of relative carrier measurements and the second set of relative carrier measurements to estimate a distance between the first device and the second device. The partial method 400 may be implemented wherein the first set of frequencies and the second set of relative carrier measurements comprises amplitude information and phase information, the second set of frequencies is a subset of the first set of frequencies, the first set of frequencies comprises a first 20 frequencies with a 4 MHz spacing between each adjacent frequency of the first 20 frequencies, the second set of frequencies comprises a second 20 frequencies with a 0.1 MHz spacing between each adjacent frequency of the second 20 frequencies, and the second set of frequencies is determined based on amplitudes of the first set of relative carrier measurements.

Figure 5:
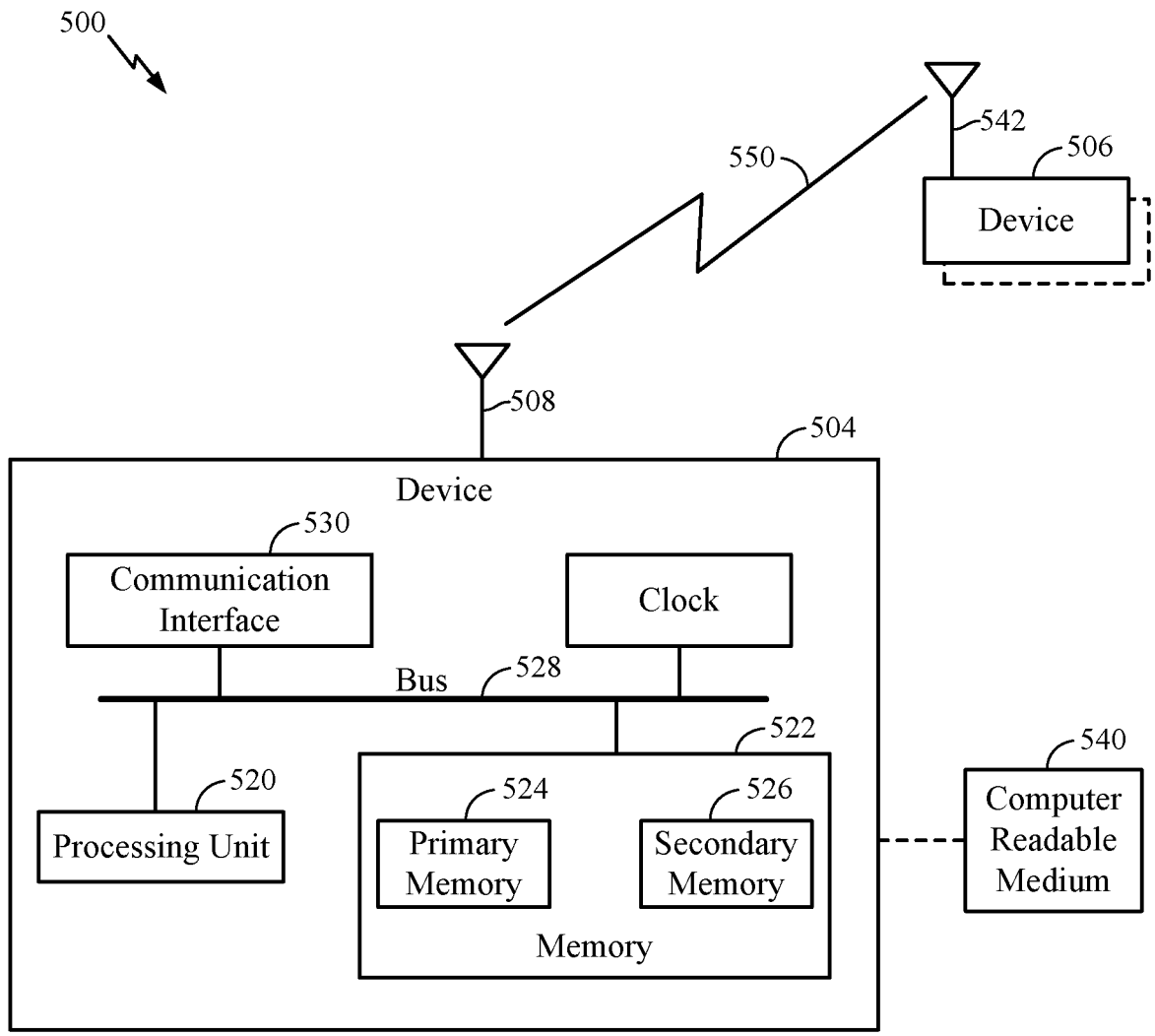
FIG. 5 illustrates a schematic block diagram of an example wireless device in accordance with some examples of the disclosure.

FIG. 5 illustrates a schematic block diagram of an example wireless device in accordance with some examples of the disclosure. System 500 may include, for example, a first device 504 (e.g., a first Bluetooth enabled wireless device) and a second device 506 (e.g., a second Bluetooth enabled wireless device), which may be operatively coupled together through a wireless communications network. In a particular implementation, as discussed herein, first device 504 and second device 506 may exchange carrier signals to measure RTP for use in computing a measured range between the first device 504 and the second device 506. In an aspect, first device 504 or second device 506 may comprise any one of several different devices such as, for example, a mobile device or access point. Also, the first and second devices 504 and 506 may be included in a wireless communications network that may comprise one or more wireless access points, for example. However, claimed subject matter is not limited in scope in these respects. The first device 504 and the second device 506 may be Bluetooth enabled wireless devices configured to operate in accordance with Bluetooth specification 5.1 including Bluetooth Low Energy configurations.

First and second devices 504 and 506 may be representative of any device, appliance or machine that is configurable to exchange data over a wireless communications network. By way of example but not limitation, any of first device 504 or second device 506 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof.

Similarly, a wireless communications network, as shown in FIG. 5, is representative of one or more communication links, processes, or resources configurable to support the exchange of data and measurements between at least first device 504 and second device 506. By way of example but not limitation, a wireless communications network may include wireless or wired communication links, telephone or telecommunications systems, data buses or channels, optical fibers, terrestrial or space vehicle resources, local area networks, personal area networks, wide area networks, intranets, the Internet, routers or switches, and the like, or any combination thereof. As illustrated, for example, by the dashed lined box illustrated as being partially obscured of second device 506, there may be additional like devices operatively coupled to system 500.

It is recognized that all or part of the various devices and networks shown in FIG. 5, and the processes and methods as further described herein, may be implemented using or otherwise including hardware, firmware, software, or any combination thereof. Thus, by way of example but not limitation, first device 504 may include at least one processing unit 520 that is operatively coupled to a memory 522 through a bus 528.

Processing unit 520 is representative of one or more circuits configurable to perform at least a portion of a data computing procedure or process. By way of example but not limitation, processing unit 520 may include one or more processors, controllers, microprocessors, microcontrollers, application specific integrated circuits, digital signal processors, programmable logic devices, field programmable gate arrays, and the like, or any combination thereof.

Memory 522 is representative of any data storage mechanism. Memory 522 may include, for example, a primary memory 524 or a secondary memory 526. Primary memory 524 may include, for example, a random access memory, read only memory, similar types of non-transitory computer readable storage mediums, etc. While illustrated in this example as being separate from processing unit 520, it should be understood that all or part of primary memory 524 may be provided within or otherwise co-located/coupled with processing unit 520. In a particular implementation, memory 522 and processing unit 520 may be configured to execute one or more aspects of process discussed herein (e.g., FIG. 4 and associated text).

Secondary memory 526 may include, for example, the same or similar type of memory as primary memory or one or more data storage devices or systems, such as, for example, a disk drive, an optical disc drive, a tape drive, a solid state memory drive, etc. In certain implementations, secondary memory 526 may be operatively receptive of, or otherwise configurable to couple to, a computer-readable medium 540. Computer-readable medium 540 may include, for example, any non-transitory medium that can carry or make accessible data, code or instructions for one or more of the devices in system 500. Computer-readable medium 540 may also be referred to as a storage medium.

First device 504 may include, for example, a communication interface 530 that provides for or otherwise supports the operative coupling of first device 504 to a wireless communications network at least through an antenna 508. Antenna 508 may be a single antenna or multiple antennas such as an antenna array. Hereinafter, antenna 508 will be described as a single antenna but it should be understood that multiple antennas or antenna arrays with multiple elements may be used instead. The second device 506 may also include a communication interface that provides for or otherwise supports the operative coupling of second device 506 to a wireless communications network at least through an antenna 542. Antenna 542 may be multiple antennas or an antenna array with multiple elements. By way of example but not limitation, communication interface 530 may include a network interface device or card, a modem, a router, a switch, a transceiver, and the like. In other alternative implementations, communication interface 530 may comprise a wired/LAN interface, wireless LAN interface (e.g., IEEE std. 802.11 wireless interface), Bluetooth® interface and/or a wide area network (WAN) air interface. It should be understood, however, that these are merely examples of air interfaces that may be employed for techniques described herein, and claimed subject matter is not limited in this respect. In a particular implementation, antenna 508 in combination with communication interface 530 may be used to implement transmission and reception of signals. In one implementation, communication interface 530 may comprise radio transceiver circuitry configurable to detect a phase of a wireless carrier signal transmitted from second device 506 and received at antenna 508. Such radio transceiver circuitry may also be configurable to transmit and receive wireless carrier signals at multiple different carrier frequencies.

First device 504 may include, for example, an input/output device. Input/output device is representative of one or more devices or features that may be configurable to accept or otherwise introduce human or machine inputs, or one or more devices or features that may be configurable to deliver or otherwise provide for human or machine outputs. By way of example but not limitation, input/output device may include an operatively configured display, speaker, keyboard, mouse, trackball, touch screen, data port, etc.

In some examples herein, aspects of the latest Bluetooth® (BT) protocol may be used by the devices in addition to the measurements of round-trip signal phase obtained from wireless carrier signals transmitted between first and second devices 504 and 506. In this context, "receiving" a signal as referred to herein means obtaining information from the signal received at a receiver device. For example, acquisition of a received signal may comprise determination of a signal phase and amplitude of the received signal. RTP works best when there is strong line of sight signal between the two devices. It has been found that performance degrades when there are also multipath signals. For example, in a room there are reflections from walls, ceiling, floor and other obstacles that all contribute towards multipath.

Figure 6:
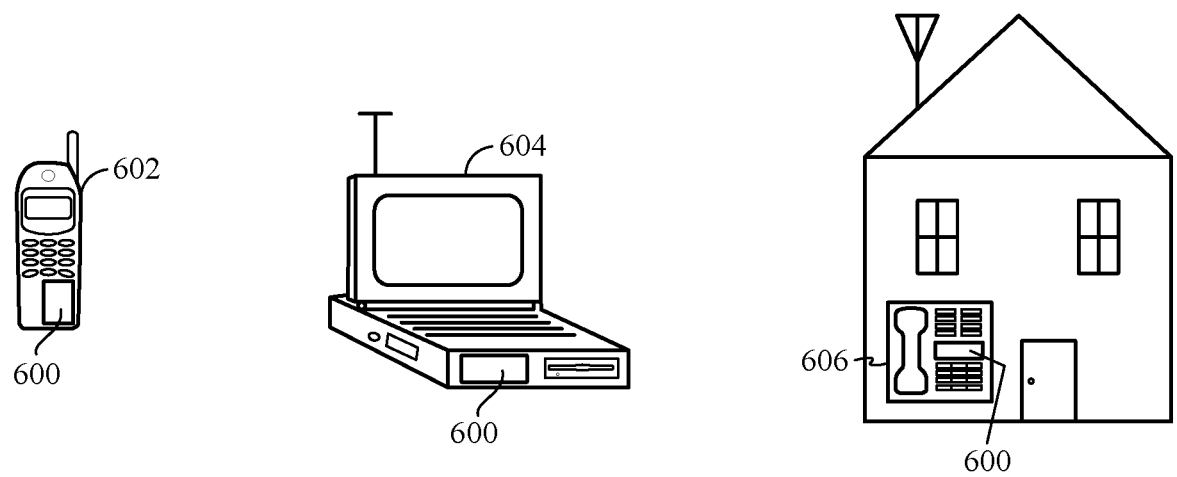
FIG. 6 illustrates various electronic devices that may be integrated with any of the aforementioned wireless devices in accordance with some examples of the disclosure.

FIG. 6 illustrates various electronic devices that may be integrated with any of the aforementioned wireless devices in accordance with some examples of the disclosure. For example, a mobile phone device 602, a laptop computer device 604, and a fixed location terminal device 606 may include an integrated device 600 as described herein. The integrated device 600 may be, for example, any of the integrated circuits, dies, integrated devices, integrated device packages, integrated circuit devices, device packages, integrated circuit (IC) packages, package-on-package devices described herein. The devices 602, 604, 606 illustrated in FIG. 6 are merely exemplary. Other electronic devices may also feature the integrated device 600 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

It will be appreciated that various aspects disclosed herein can be described as functional equivalents to the structures, materials and/or devices described and/or recognized by those skilled in the art.

One or more of the components, processes, features, and/or functions illustrated in FIGS. 1-6 may be rearranged and/or combined into a single component, process, feature or function or incorporated in several components, processes, or functions. Additional elements, components, processes, and/or functions may also be added without departing from the disclosure.

In this description, certain terminology is used to describe certain features. The term "mobile device" can describe, and is not limited to, a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable.

The wireless communication between electronic devices can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE), 5G, Bluetooth (BT), Bluetooth Low Energy (BLE) or other protocols that may be used in a wireless communications network or a data communications network. Bluetooth Low Energy (also known as Bluetooth LE, BLE, and Bluetooth Smart) is a wireless personal area network technology designed and marketed by the Bluetooth Special Interest Group intended to provide considerably reduced power consumption and cost while maintaining a similar communication range. BLE was merged into the main Bluetooth standard in 2010 with the adoption of the Bluetooth Core Specification Version 4.0 and updated in Bluetooth 5.1 (both expressly incorporated herein in their entirety).

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be incorporated entirely within any form of computer readable storage medium having stored therein a corresponding set of computer instructions that upon execution would cause an associated processor to perform the functionality described herein. Thus, the various aspects of the disclosure may be incorporated in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the examples disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be incorporated directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art including non-transitory types of memory or storage mediums. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions of this method.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method for a range measurement between two devices, comprising:
   determining a first set of relative carrier measurements between a first device and a second device at a first set of frequencies;
   determining a second set of frequencies from the first set of relative carrier measurements based on magnitudes of the relative carrier measurements in the first set of relative carrier measurements;

determining a second set of relative carrier measurements between the first device and the second device at the second set of frequencies; and combining the first set of relative carrier measurements and the second set of relative carrier measurements to estimate a distance between the first device and the second device.

2. The method of claim 1, wherein the first set of relative carrier measurements and the second set of relative carrier measurements comprise magnitude information and phase information.

3. The method of claim 1, wherein the second set of frequencies is within a range of the first set of frequencies.

4. The method of claim 2, wherein the determined second set of frequencies is based on the magnitude information and phase information of the first set of relative carrier measurements.

5. The method of claim 1, wherein the magnitudes of the relative carrier measurements in the first set of relative carrier measurements are evaluated to determine fading regions that are avoided in determining the second set of frequencies.

6. The method of claim 1, wherein one of the first device or the second device comprises multiple antennas.

7. A non-transitory computer-readable medium comprising instructions that when executed by a processor cause the processor to perform a method comprising:

determining a first set of relative carrier measurements between a first device and a second device at a first set of frequencies;

determining a second set of frequencies from the first set of relative carrier measurements based on magnitudes of the relative carrier measurements in the first set of relative carrier measurements;

determining a second set of relative carrier measurements between the first device and the second device at the second set of frequencies; and combining the first sets of relative carrier measurements and the second set of relative carrier measurements to estimate a distance between the first device and the second device.

8. The non-transitory computer-readable medium of claim 7, wherein the first set of relative carrier measurements and the second set of relative carrier measurements comprise magnitude information and phase information.

9. The non-transitory computer-readable medium of claim 7, wherein the second set of frequencies is within a range of the first set of frequencies.

10. The non-transitory computer-readable medium of claim 8, wherein the determined second set of frequencies is based on the magnitude information and the phase information of the first set of relative carrier measurements.

11. The non-transitory computer-readable medium of claim 7, wherein the magnitudes of the relative carrier measurements in the first set of relative carrier measurements are evaluated to determine fading regions that are avoided in determining the second set of frequencies.

12. A wireless device for providing a range estimate, comprising:

a memory;

an antenna; and a processor coupled to the memory and the antenna, the processor configured to:

receive a first set of carrier signals from a second device at a first set of frequencies;

determine a first set of relative carrier measurements between the wireless device and the second device at the first set of frequencies based on the first set of carrier signals;

determine a second set of frequencies from the first set of relative carrier measurements based on magnitudes of the relative carrier measurements in the first set of relative carrier measurements;

receive a second set of carrier signals from the second device at a second set of frequencies;

determine a second set of relative carrier measurements between the wireless device and the second device at the second set of frequencies based on the second set of carrier signals; and combine the first sets of relative carrier measurements and the second set of relative carrier measurements to estimate a distance between the wireless device and the second device.

13. The wireless device of claim 12, wherein the first set of relative carrier measurements and the second set of relative carrier measurements comprise magnitude information and phase information.

14. The wireless device of claim 12, wherein the second set of frequencies is within a range of the first set of frequencies.

15. The wireless device of claim 13, wherein the determined second set of frequencies is based on the magnitude information and the phase information of the first set of relative carrier measurements.

16. The wireless device of claim 12, wherein the magnitudes of the relative carrier measurements in the first set of relative carrier measurements are evaluated to determine fading regions that are avoided in determining the second set of frequencies.

17. The wireless device of claim 12, wherein the antenna comprises multiple antennas.

* * * * *